US009424617B2

(12) United States Patent
Yokota et al.

(10) Patent No.: US 9,424,617 B2
(45) Date of Patent: Aug. 23, 2016

(54) GRAPHICS COMMAND GENERATION DEVICE AND GRAPHICS COMMAND GENERATION METHOD

(71) Applicant: Sony Computer Entertainment Inc., Tokyo (JP)

(72) Inventors: Kenichiro Yokota, Tokyo (JP); Keisuke Inoue, Kanagawa (JP); Makoto Izawa, Tokyo (JP); Takeshi Nakagawa, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 190 days.

(21) Appl. No.: 13/690,004

(22) Filed: Nov. 30, 2012

(65) Prior Publication Data

US 2013/0141448 A1    Jun. 6, 2013

(30) Foreign Application Priority Data

Dec. 6, 2011  (JP) .................................. 2011-267090

(51) Int. Cl.
*G06T 1/00*    (2006.01)
*G06T 15/00*   (2011.01)
*G06F 9/45*    (2006.01)

(52) U.S. Cl.
CPC ... *G06T 1/00* (2013.01); *G06F 8/44* (2013.01); *G06F 8/4435* (2013.01); *G06T 15/005* (2013.01)

(58) Field of Classification Search
CPC ......... G06T 15/005; G06T 1/20; G06T 15/00; G06T 1/00; G06F 9/3879; G06F 9/30; G06F 8/44; G06F 8/4435; G09G 5/363

USPC .................................. 345/522, 505, 506, 502
See application file for complete search history.

(56) References Cited

U.S. PATENT DOCUMENTS 5,329,616 A   7/1994 Silverbrook
5,966,140 A * 10/1999 Popovic et al. ............... 345/441
(Continued)

FOREIGN PATENT DOCUMENTS

CN   101663640 A   3/2010
JP   06-243243 A   9/1994
(Continued)

OTHER PUBLICATIONS

Office Action issued for corresponding Japanese Patent Application No. 2011-267090, dated Sep. 10, 2013.
(Continued)

*Primary Examiner* — Xiao Wu
*Assistant Examiner* — Chong Wu
(74) *Attorney, Agent, or Firm* — Matthew B. Dernier, Esq.

(57) ABSTRACT

An intermediate command generation unit generates intermediate commands, which are intermediate rendering commands having model data for rendering an object. A graphics command conversion unit converts the generated intermediate commands into a graphic command sequence for execution by a graphics processor. An identity determination unit determines whether a state of a graphics command to be generated from an intermediate command is the same as a state of the graphics command generated previously. A graphics command generation unit generates a graphics command determined by the identity determination unit as not having the same state, and does not generate a graphics command determined as having the same state, defining the command as a redundant command.

7 Claims, 8 Drawing Sheets

(56) References Cited

U.S. PATENT DOCUMENTS

| | | | |
|---|---|---|---|
| 6,574,360 B1* | 6/2003 | Berdardini et al. | 382/154 |
| 8,200,594 B1* | 6/2012 | Bleiweiss | 706/45 |
| 8,269,782 B2 | 9/2012 | Washizu | |
| 2007/0013694 A1* | 1/2007 | Gold | G06T 17/20 345/420 |
| 2007/0061286 A1* | 3/2007 | Liu et al. | 707/2 |
| 2008/0141131 A1* | 6/2008 | Cerny et al. | 715/716 |
| 2008/0278509 A1 | 11/2008 | Washizu | |
| 2009/0002263 A1 | 1/2009 | Pasetto | |
| 2010/0302259 A1* | 12/2010 | Akita | 345/501 |

FOREIGN PATENT DOCUMENTS

| | | |
|---|---|---|
| JP | 2008123520 A | 5/2008 |
| JP | 2011-083914 A | 4/2011 |

OTHER PUBLICATIONS

Office Action issued for corresponding Chinese Patent Application No. 2012105113878, dated Apr. 29, 2015.

\* cited by examiner

GRAPHICS COMMAND GENERATION DEVICE AND GRAPHICS COMMAND GENERATION METHOD

BACKGROUND OF THE INVENTION

1. Field of the Invention

The present invention relates to a technology of generating a graphics command and, more particularly, to a technology of generating a graphics command from an intermediate command.

2. Description of the Related Art

High-quality graphics are extensively used now as personal computers and gaming devices are used to run applications like games and simulations that use high-quality three-dimensional graphics and to play back image content in which actual footage and computer graphics are blended.

Generally, graphics processing is performed by using a CPU and a graphics processing unit coordinated with each other. A CPU is a general-purpose processor capable of general purpose computation, while a GPU is a special-purpose processor for advanced graphics computation. A CPU performs geometric computation such as projection transformation based on a three-dimensional model of an object. A GPU receives vertex data etc., from a CPU and performs rendering accordingly. A GPU comprises special-purpose hardware such as a rasterizer and a pixel shader and performs graphics processing using a pipeline process. In some recent GPUs, the shader capability is programmable as exemplified by a program shader. In general, a graphics library is provided to support shader programming.

To render an object, the CPU needs to generate a graphics command executed by the hardware of the GPU and deliver the generated command to the GPU. Generation of a graphics command requires much CPU time. This is sometimes addressed by introducing an intermediate command and dividing the process of generating a graphics command into two stages including generation of a intermediate command and conversion from the intermediate command to the graphics command. By executing generation of an intermediate command and conversion from the intermediate command to a graphics command in separate threads, it is possible to execute in parallel the process of generating an intermediate command and then converting the intermediate command into a graphics command, and processes other than graphics processing such as physical model computation for rendering subsequent frames. As a result of that, the CPU utilization can be improved.

[patent document 1] JP2008-123520

However, conversion from a plurality of intermediate commands into graphics commands may result in the same graphics command being repeatedly executed in spite of the fact that the state remains unchanged in a sequence of generated graphics commands. Due to this redundancy, the efficiency of execution is lowered.

SUMMARY OF THE INVENTION

The present invention addresses the problem and a purpose thereof is to provide a technology capable of improving the efficiency of executing graphics commands generated from intermediate commands.

The graphics command generating device according to at least one embodiment comprises: an intermediate command generation unit configured to generate intermediate commands, which are intermediate rendering commands having model data for rendering an object; and a graphics command conversion unit configured to convert the generated intermediate commands into a graphic command sequence for execution by a graphics processor. The graphics command conversion unit comprises: an identity determination unit configured to determine whether a state of a graphics command to be generated from an intermediate command is the same as a state of a graphics command generated previously; and a graphics command generation unit configured to generate a graphics command determined by the identity determination unit as not having a state that is the same, and to not generate a graphics command determined as having the same state, defining said command as a redundant command.

Another embodiment of the present invention relates to a graphics command generation method. The graphics command generation method comprises: generating intermediate commands, which are intermediate rendering commands having model data for rendering an object; and converting the generated intermediate commands into a graphic command sequence for execution by a graphics processor. The converting comprises: determining whether a state of a graphics command to be generated from an intermediate command is the same as a state of a graphics command generated previously; and generating a graphics command determined as not having a state that is the same, and not generating a graphics command determined as having the same state, defining said command as a redundant command.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
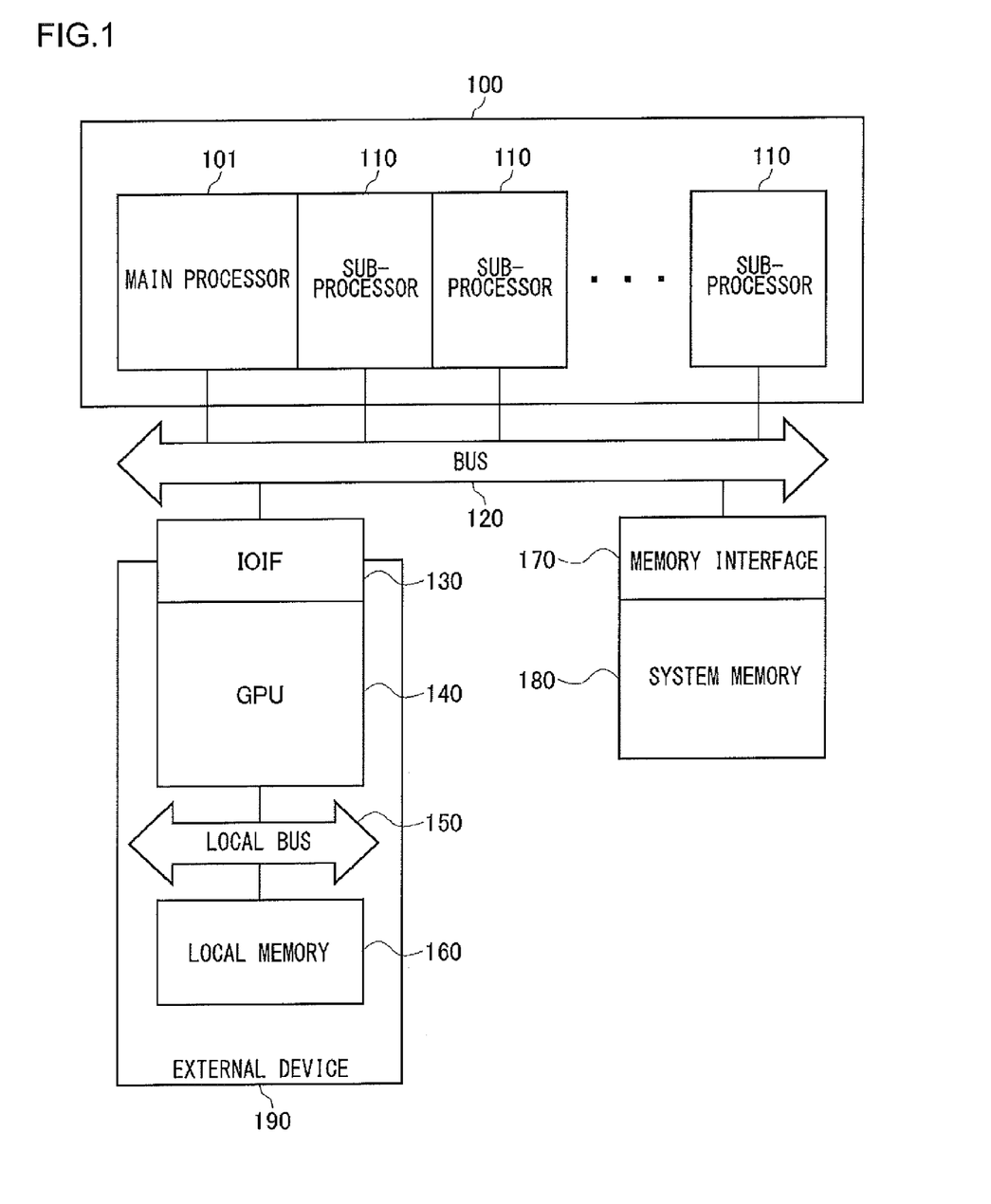
FIG. 1 shows the configuration of the graphics processing system according to the embodiment.

FIG. 1 shows the configuration of the graphics processing system according to the embodiment. The graphics processing system comprises a main processing unit 100, a graphics processing unit 140, a system memory 180, and a local memory 160.

The main processing unit 100 may be a single main processor, or a multiprocessor including a plurality of processors, or a multicore processor including a plurality of processor cores integrated in a single package. In this case, the main processing unit 100 is exemplified by a heterogeneous multicore processor including a main processor 101 and a plurality of subprocessors 110. The main processor 101 and the plurality of subprocessors 110 are connected to a bust 120. A system memory 180 is connected to the bus 120 via a memory interface 170. The main processor 101 and the plurality of subprocessors 110 are capable of writing and reading data in the system memory 180 via the bus 120.

An external device 190 is connected to the bus 120 via an input and output interface (hereinafter, "IOIF") 130. The external device 190 includes the graphics processing unit 140 and the local memory 160. However, the illustrated system is by way of example only.

The graphics processing unit (hereinafter, simply referred to as "GPU") 140 is a graphic chip provided with a graphic processor core and is capable of reading and writing data in the memory 160 via a local bus 150.

The main processing unit 100 and the GPU 140 are connected via the IOIF 130. The main processing unit 100 and the GPU 140 can exchange data via the IOIF 130.

The main processing unit 100 generates a rendering command for rendering an object and queues the commands in a command buffer provided in the system memory 180. The GPU 140 sequentially reads the rendering commands stored in the command buffer and processes the read commands.

The main processing unit 100 generates geometry data such as vertex coordinate values, vertex color, normal vector, and UV values, based on the three-dimensional model of an object, and stores the geometry data in the system memory 180. Further, the main processing unit 100 stores a texture to be mapped to the surface of a polygon in the system memory 180. Still further, the main processing unit 100 reads a shader program from a recording medium such as a hard disk and stores the program in the system memory 180.

The memory area of the system memory 180 is memory-mapped to the I/O address space. The GPU 140 is capable of reading the memory area of the system memory 180 memory-mapped to the I/O address space via the IOIF 130.

The memory area of the system memory 180 storing the geometry data, the texture, and the shader program is memory-mapped to the I/O address space in a memory provided in the controller of the IOIF 130. The GPU 140 reads the geometry data, the texture, and the shader program memory-mapped to the I/O address space via the IOIF 130. The GPU 140 stores in the local memory 160 data necessary for graphics computation such as the geometry data, the texture, etc., read from the system memory 180.

The GPU 140 generates rasterized data of a polygon according to the shader program, using the geometry data, and writes pixel data in the frame buffer in the local memory 160. Further, the GPU 140 maps the texture on the surface of the polygon and writes the pixel data occurring after texture mapping in the frame buffer.

Figure 2:
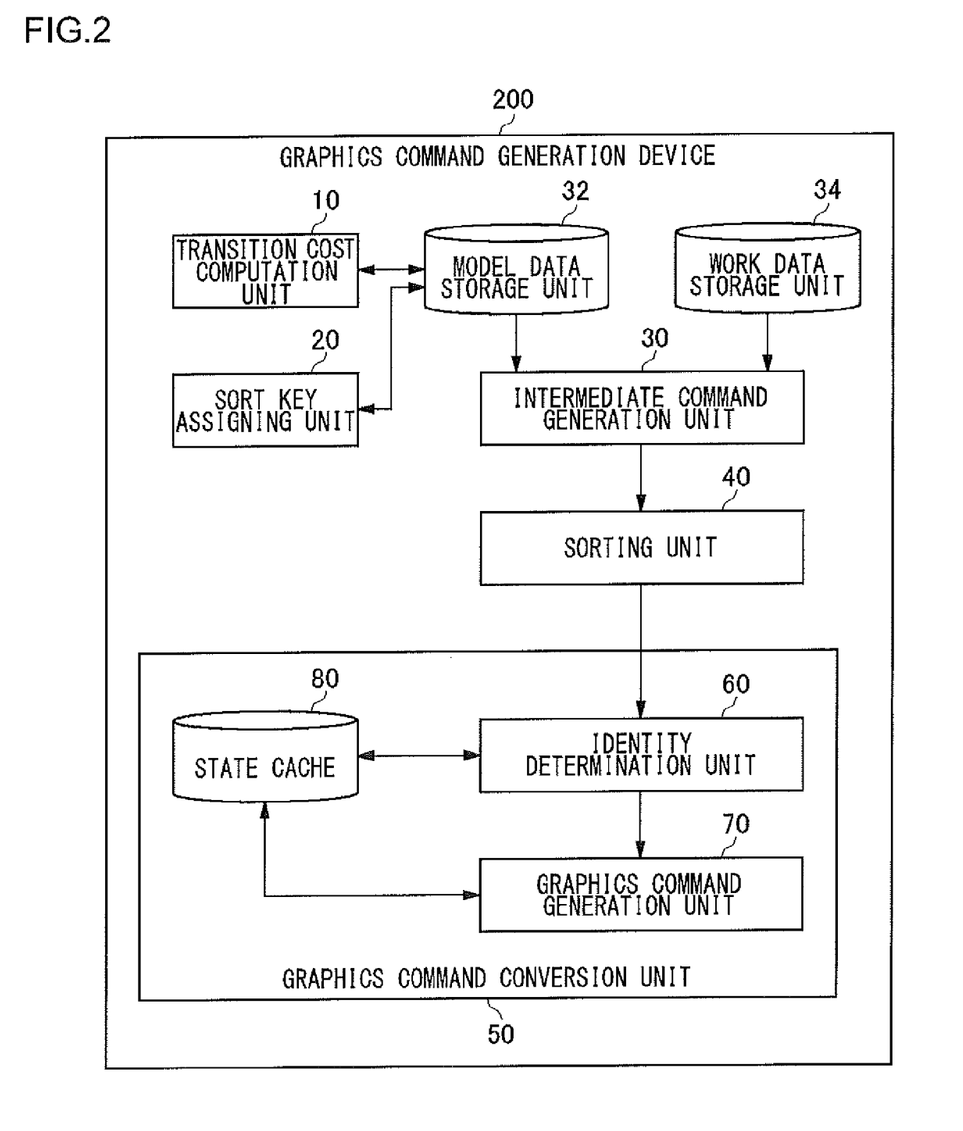
FIG. 2 shows the configuration of the graphics command generation device.

FIG. 2 shows the configuration of the graphics command generation device 200. The graphics command generation device 200 is implemented in the main processing unit 100. If the main processing unit 100 is a multicore processor, a thread on the main processor 101 or on at least one of the subprocessors 110 implements the functions of the graphics command generation device 200.

The graphics command generation device 200 includes a transition cost computation unit 10, a sort key assigning unit 20, an intermediate command generation unit 30, a model data storage unit 32, a work data storage unit 34, a sorting unit 40, and a graphics command conversion unit 50. The graphics command conversion unit 50 includes an identity determination unit 60, a graphics command generation unit 70, and a state cache 80.

An intermediate command includes model data and work data for rendering of an object. Model data represents information not updated between frames, such as geometry data, a texture, and a shader program, and is stored in the model data storage unit 32. Work data represents information updated for each frame, such as the position and orientation of an object, and is stored in the work data storage unit 34.

The transition cost computation unit 10 reads model data from the model data storage unit 32, computes a transition cost incurred when the model data makes a transition between two intermediate commands. The transition cost computation unit 10 stores the transition cost in the model data storage unit 32.

The sort key assigning unit 20 determines the sequence in which the model should make a transition in accordance with the transition cost. The sort key assigning unit 20 assigns a sort key to the model data in accordance with the determined sequence and stores the resultant model data in the model data storage unit 32. The sort key assigning unit 20 starts with a given item of model data, e.g., with the model data that most occupies the displayed screen area. The sort key assigning unit 20 determines the sequence in which the model data should make a transition by scanning the model data in the ascending order of the transition cost, and assigns sort keys to the model data according to the determined sequence of transition.

The intermediate command generation unit 30 reads the model data for each frame from the model data storage unit 32, reads the work data from the work data storage unit 34, and generates an intermediate command having the model data and the work data from a scene graph including information on an object to be rendered.

The sorting unit 40 changes the order of execution of a plurality of intermediate commands generated by the intermediate command generation unit 30, in accordance with the sort keys assigned to the model data of the respective intermediate commands.

The graphics command conversion unit 50 converts the plurality of intermediate commands, the order of execution of which is changed by the sorting unit 40, into a graphics command sequence for execution by the graphics processor.

The identification unit 60 in the graphics command converter 50 determines whether the state of a graphics command generated from an intermediate command is identical to the state of a graphics command generated previously. The graphics command generation unit 70 generates a graphics command determined by the identification determination unit 60 as not being identical in state to the previously generated graphics command. The graphics command generation unit 70 does not generate a graphics command determined as being identical in state to the previously generated graphics command, defining such a command as a redundant command.

More specifically, the state of the graphics command generated by the graphics command generation unit 70 is cached in the state cache 80. The identity determination unit 60 refers to the state cache 80, using the state of the graphics command that should be generated from the intermediate command as a key. If a cache hit occurs, the identity determination unit 60 determines that the state of the graphics command that should be generated from the intermediate command is identical to the state of the previously generated graphics command. In the absence of a cache hit, the identity determination unit 60 updates the state value cached in the state cache 80 with the state value of the graphics command that should be generated from the intermediate command. In the event of a cache hit, the graphics command generation unit 70 defines the graphics command as a redundant command and does not generate the graphics command. In the absence of a cache hit, the graphics command generation unit 70 generates the graphics command.

The graphics command generated by the graphical command generation unit 70 is delivered to the GPU 140 and executed by the hardware of the GPU 140 so as to render the object.

FIGS. 3A-3D show how graphics commands are generated from intermediate commands.

Figure 3A:
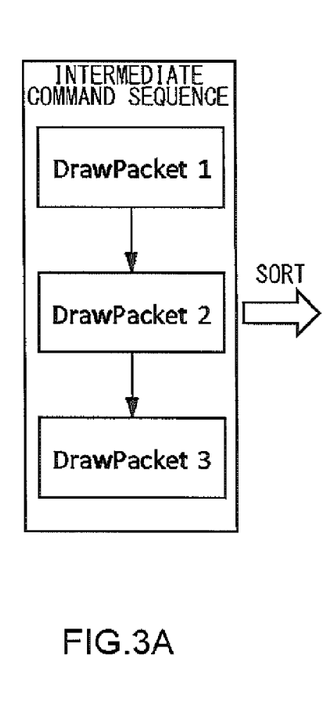
FIGS. 3A-3D show how graphics commands are generated from intermediate commands.
Figure 3B:
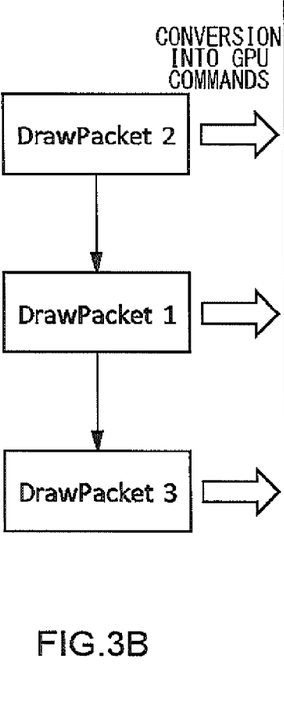

FIG. 3A shows an intermediate a sequence of intermediate commands generated by the intermediate command generation unit 30. In this example, DrawPacket1, DrawPacket2, and DrawPacket3 are generated as intermediated commands in the stated order. FIG. 3 shows a sequence of intermediate commands sorted by the sorting unit 40. The order of execution of the two intermediate commands DrawPacket1 and DrawPacket2 is changed as a result of sorting with the result that the intermediate commands are executed in the order DrawPacket2, DrawPacket1, and DrawPacket3. By executing the intermediate commands in the order of execution of the intermediate commands generated by the sorting unit 40, the transition cost of the model data will be lowered than when the intermediate commands are executed in the order of execution generated by the intermediate command generation unit 30.

Figure 3C:
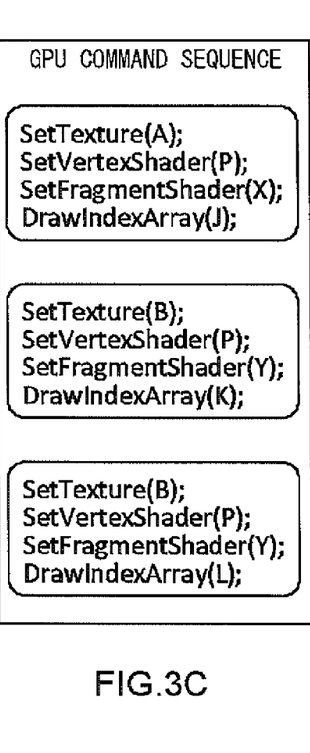
Figure 3D:
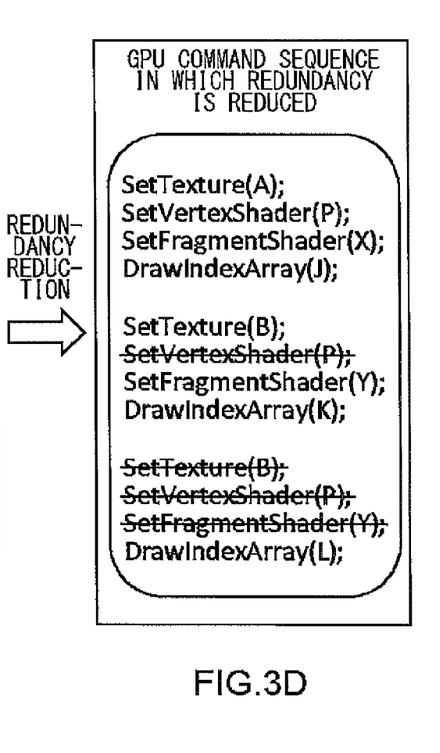

FIGS. 3C and 3D show how the graphics command converter 50 converts intermediate commands into graphics commands.

For the purpose of comparison, a description will first be given, with reference to FIG. 3C, of a graphics command sequence generated by conversion from intermediate commands without using the identity determination unit 60.

The graphics command generation unit 70 converts the first intermediate command DrawPacket2 in the intermediate command sequence sorted by the sorting unit 40 into a graphics command sequence as indicated below.
SetTexture(A);
SetVertexShader(P);
SetFragmentShader(X);
DrawIndexArray(J);

This will be referred to as the first graphics command sequence. SetTexture is a graphics command for defining a texture, SetVertexShader is a graphics command for defining a vertex shader program, SetFragmentShader is a graphics command for defining a fragment shader, DrawIndexArray is a graphics command for performing rendering in accordance with a parameter and a program defined. A, P, X, and J in the parentheses denote states. For example, the argument A of the function SetTexture( ) denotes a texture ID, the argument P of SetVertexShader( ) denotes the shader ID or the address of the program on the memory.

Subsequently, the graphics command generation unit 70 converts the second intermediate command DrawPacket1 in the intermediate command sequence sorted by the sorting unit 40 into a graphics command sequence as indicated below.
SetTexture(B);
SetVertexShader(P);
SetFragmentShader(Y);
DrawIndexArray(K);

This will be referred to as the second graphics command sequence.

Further, the graphics command generation unit 70 converts the third intermediate command DrawPacket3 in the intermediate command sequence sorted by the sorting unit 40 into a graphics command sequence as indicated below.
SetTexture(B);
SetVertexShader(P);
SetFragmentShader(Y);
DrawIndexArray(L);

This will be referred to as the third graphics command sequence.

A description will be given, with reference to FIG. 3D, of a graphics command sequence generated by conversion from intermediate commands using the identity determination unit 60.

The identification unit 60 compares the first graphics command sequence and the second graphics command sequence and determines whether the same graphics command with the same state value is repeatedly generated. SetTexture(B) in the second graphics command sequence is the same type of graphics command as SetTexture(A) in the first graphics command sequence, but the commands differ in in the state value (B≠A). SetVertexShader(P) in the second graphics command sequence is the same type of graphics command as SetVertexShader(P) in the first graphics command sequence, and the commands are identical in the state value (both commands include P). SetFragmentShader(Y) in the second graphics command sequence is the same type of graphics command as SetFragmentShader(X) in the first graphics command sequence, but the commands differ in the state value (Y≠X). DrawIndexArray(K) in the second graphics command sequence is the same type of graphics command as DrawIndexArray(J) in the first graphics command, but the commands differ in the state value (K≠J).

SetVertexShader(P) in the second graphics command sequence is the same type of command as and is of the same state as SetVertexShader(P) in the first graphics command sequence, and so is a redundant command that need not be executed. Thus, the graphics command generation unit 70 does not generate SetVertexShader(P) in the second graphics command sequence based on the result of determination by the identity determination unit 60, and generates the remaining commands SetTexture(B), SetFragmentShader(Y), and DrawIndexArray(K). In other words, if the identity determination unit 60 is operated, the second graphics command sequence generated by the graphics command generation unit 70 will be as follows.
SetTexture(B);
SetFragmentShader(Y);
DrawIndexArray(K);

Similarly, the identification unit 60 compares the second graphics command sequence and the third graphics command sequence and determines whether the same graphics command with the same state value is repeatedly generated. SetTexture(B) in the third graphics command sequence is the same type of graphics command as SetTexture(B) in the second graphics command sequence, and the commands are identical in the state value (both commands include B). SetVertexShader(P) in the third graphics command sequence is the same type of graphics command as SetVertexShader(P) in the second graphics command sequence, and the commands are identical in the state value (both commands include P). SetFragmentShader(Y) in the third graphics command sequence is the same type of graphics command as SetFragmentShader(Y) in the second graphics command sequence, and the commands are identical in the state value (both commands include Y). DrawIndexArray(L) in the third graphics command sequence is type same type of graphics command as DrawIndexArray(K) in the second graphics command, but the commands differ in the state value ($L \ne K$).

SetTexture(B), SetVertexShader(P), and SetFragmentShader(Y) in the third graphics command sequence are the same type of command as and are of the same state as SetTexture(B), SetVertexShader(P), and SetFragmentShader(Y) in the second graphics command sequence, and so are redundant commands that need not be executed. Thus, the graphics command generation unit 70 does not generate SetTexture (B), SetVertexShader(P), and SetFragmentShader(Y) in the third graphics command sequence based on the result of determination by the identity determination unit 60, and generates the remaining command DrawIndexArray(L). In other words, if the identity determination unit 60 is operated, the third graphics command sequence generated by the graphics command generation unit 70 will be as follows.
DrawIndexArray(L);

To summarize the above, according to the graphics command conversion unit 50 of the embodiment, the identity determination unit 60 determines the identity of the states of the graphics commands. The graphics command generation unit 70 generates the following graphics command sequence, in which redundancy is eliminated, from the intermediate command sequence sorted by the sorting unit 40, based on the result of determination on identify.
 SetTexture(A);
 SetVertexShader(P);
 SetFragmentShader(X);
 DrawIndexArray(J);
 SetTexture(B);
 SetFragmentShader(Y);
 DrawIndexArray(K);
 DrawIndexArray(L);

In comparison with the case where the identity determination unit 60 is not in operation as shown in FIG. 3C, the number of generated graphics commands is reduced from 12 to 8 so that the processing efficiency is improved.

A description will be given of the significance of sorting, as shown in FIG. 3B, the intermediate command sequence generated by the intermediate command generation unit 30 shown in FIG. 3A, by using the sorting unit 40.

If it is assumed that the sorting unit 40 does not sort the intermediate command sequence, the graphics command sequence is generated according to the intermediate command sequence of FIG. 3A. Without the operation of the identity determination unit 60, the intermediate command sequence will in this case be converted into the following graphics command sequence.
 SetTexture(B);
 SetVertexShader(P);
 SetFragmentShader(Y);
 DrawIndexArray(K);
 SetTexture(A);
 SetVertexShader(P);
 SetFragmentShader(X);
 DrawIndexArray(J);
 SetTexture(B);
 SetVertexShader(P);
 SetFragmentShader(Y);
 DrawIndexArray(L);

If the identity determination unit 60 is in operation, the sixth command SetVertexShader(P) in the above graphics command sequence is of the same state as the second command SetVertexShader(P) executed previously and so can be deleted as a redundant command. Similarly, the tenth command SetVertexShader(P) is of the same state as the sixth SetVertexShader(P) executed previously and so can be deleted as a redundant command. However, the other graphics commands differ in the state from the previously executed commands of the same type and so are not redundant. For example, the fifth command SetTexture(A) differs in the state from the first command SetTexture(B) executed previously, and the ninth command SetTexture(B) differs in the state from the fifth command SetTexture(A) executed previously so that execution of these commands cannot be saved.

Therefore, only two graphics commands can be deleted as being redundant as a result of determination on identity by the identity determination unit 60. The graphics command sequence generated by the graphics command generation unit 70 with reduced redundancy will include 10 graphics commands as indicated below.
 SetTexture(B);
 SetVertexShader(P);
 SetFragmentShader(Y);
 DrawIndexArray(K);
 SetTexture(A);
 SetFragmentShader(X);
 DrawIndexArray(J);
 SetTexture(B);
 SetFragmentShader(Y);
 DrawIndexArray(L);

Thus, by sorting the order of executing the intermediate command sequence by the sorting unit 40, the number of graphics commands determined by the identity determination unit 60 as being redundant can be increased, and an optimized sequence of graphics commands with reduced redundancy can be generated by the graphics command generation unit 70 so that the efficiency of graphics processing can be improved.

A detailed description will be given of the process of sorting an intermediate command sequence according to transition cost.

Figure 4A:
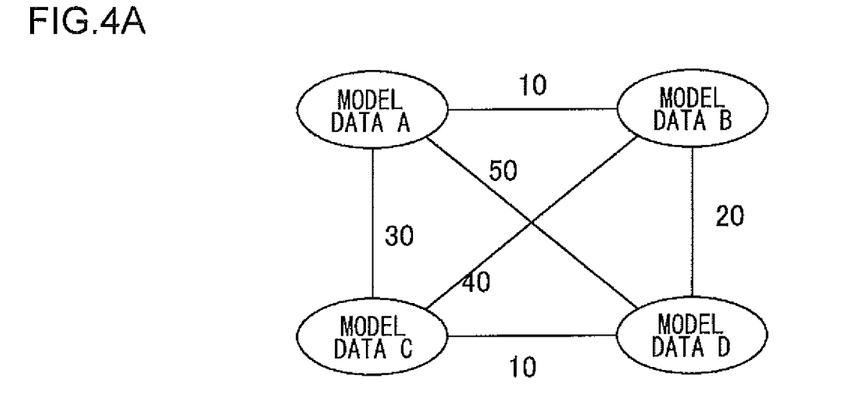
FIG. 4A illustrates the method of computing a transition cost of model data by using the transition cost computation unit of FIG. 2.
Figure 4B:
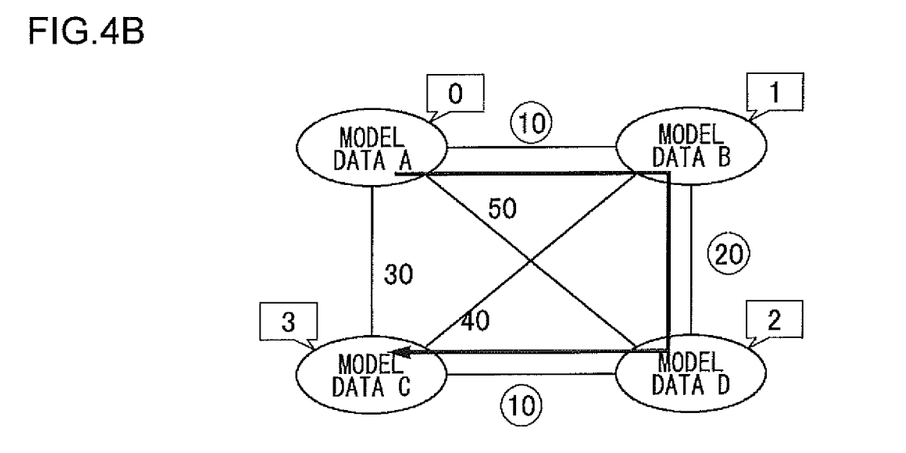
FIG. 4B illustrates the method of assigning a sort key to the model data by using the sort key assigning unit 20.

FIG. 4A illustrates the method of computing a transition cost of model data by using the transition cost computation unit 10, and FIG. 4B illustrates the method of assigning a sort key to the model data by using the sort key assigning unit 20.

The transition cost computation unit 10 computes the transition cost indicating the processing cost imposed on the hardware for graphics computation performed when a given item of model data makes a transition to another item of model data. For example, if the texture is changed as a result of transition of model data, the transition cost of 10 points is scored. If the fragment shader is changed, the transition cost of 30 points is scored. If the vertex shader is changed, the transition cost of 20 points is scored. These points indicate the relative load imposed on the graphics hardware when the texture, the fragment shader, or the vertex shader are changed.

For example, if three textures are changed and one fragment shader is changed when a transition from model data A to model data B occurs, the transition cost will be $10 \times 3 + 30 = 60$ points in total.

The transition cost computation unit 10 examines the model for all objects rendered in each frame and computes the transition cost in a transition occurring between two items of model data. FIG. 4A shows an example where four items of model data A-D are given, and the transition cost between two arbitrary items of model data is computed. The transition cost from model data A to model data B is 10, the transition cost from model data A to model data C is 30, the transition cost from model data A to model data D is 50, the transition cost from model data B to model data C is 40, the transition cost from model data B to model data D is 20, and the transition cost from model data C to model data D is 10.

The sort key assigning unit 20 starts with the model data that most occupies the displayed screen area (e.g., the model data that will occupy the center of the screen), and scans all model data by repeatedly selecting the model data with the least transition cost. The sort key assigning unit 20 determines the sequence in which the model data should make a transition and assigns the sort key to the model data in accordance with the sequence of transition.

The reason that the sort key assigning unit 20 starts with the model data that will occupy the center of the screen is that, by rendering such model data first, the likelihood is increased that pixels generated by subsequent intermediate commands are hidden behind so that associated steps can be skipped by culling and the processing efficiency is improved accordingly.

In this case, it will be assumed that model data A occupies the center of the screen so that sorting is started with model data A. As shown in FIG. 4B, the cost of transition from the starting model data A to model data B is 10 points, the cost of transition to model data C is 30 points, and the cost of transition to model data D is 50 points. Therefore, model data B with the least transition cost among the three items of model data B, C, and D is selected as the second destination of transition.

Similarly, the cost of transition from model data B to model data C is 40 points, and the cost of transition to model data D is 20 points. Therefore, model data D with the least transition cost among the two items of model data C and D is selected as the third destination of transition. Finally, a transition occurs from model data D to model data C that remains. The cost of transition to the fourth model data C is 10.

Thus, the sort key assigning unit 20 determines the sequence A, B, D, and C in which the model data should make a transition, in accordance with the transition cost between items of model data, and assigns sort keys 0, 1, 2, and 3 to the items of model data A, B, D, and C, respectively.

In this example, the transition cost between two arbitrary items of model data is computed. A given item of model data is defined as a starting data, and the minimum transition cost is identified so as to determine the sequence of transition of model data and assign sort keys accordingly. Alternatively, the sequence of transition of model data may be determined according to the transition cost, by using an alternative search algorithm. Still alternatively, if a heavy processing load is imposed by exhaustively computing the transition cost between two arbitrary items of model data, the transition cost may be determined for some combinations of items of model data and the path for scanning model data may be limited to the range in which the transition cost is determined.

When the intermediate command generation unit 30 generates an intermediate command having model data and work data, a sort key is assigned to the model data. The sorting unit 40 sorts the intermediate command sequence generated by the intermediate command generation unit 30 according to the order defined by the sort keys. This allows intermediate commands with similar model data to be clustered and executed in succession.

By causing the model data to make a transition in the ascending order of transition cost of the model data, the states of repeatedly executed graphics commands in the graphics command sequence generated from the intermediate command sequence will more likely to match. For example, that the transition cost is smaller means that the texture or shader is less frequently changed and that the state of the graphics command is less frequently changed. For this reason, by sorting the intermediate command sequence in the ascending order of transition cost of the model data and then converting the intermediate command sequence into the graphics command sequence, the number of graphics commands that can be deleted as a result of identity determination can be increased.

Figure 5:
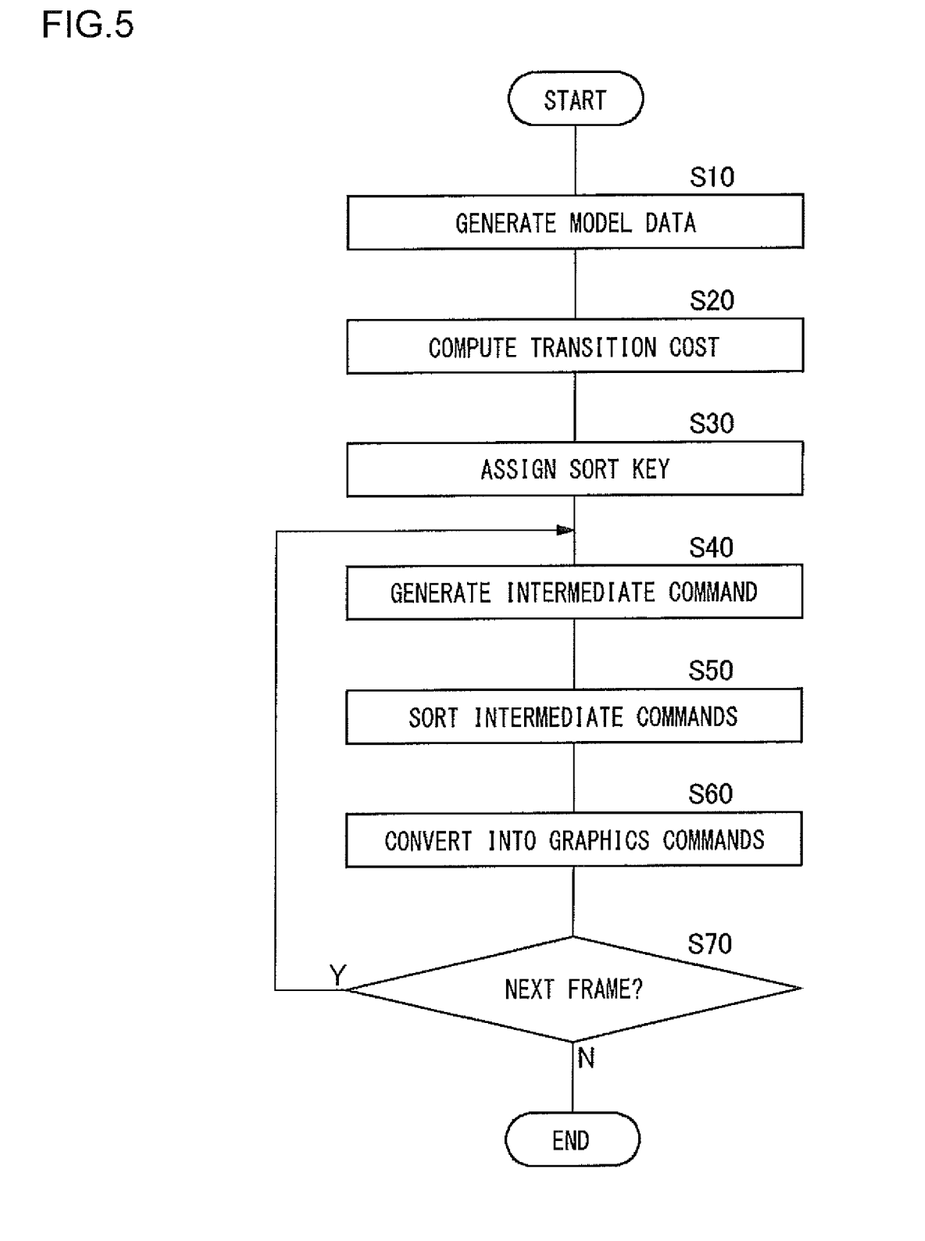
FIG. 5 is a flowchart showing the steps of generating graphics commands by the graphics command generation device according to the embodiment.

FIG. 5 is a flowchart showing the steps of generating graphics commands by the graphics command generation device 200 according to the embodiment.

Model data for all objects to be rendered is generated (S10). The transition cost computation unit 10 computes the transition cost incurred when a transition occurs between model data (S20). The sort key assigning unit 20 determines the sequence in which the model data should make a transition in accordance with the transition cost and assigns sort keys to the model data in the determined sequence (S30). Steps S10-S30 are executed off line, and the model data with the sort keys assigned is stored in the model data storage unit 32.

Steps S40-S70 are repeated for the frames. First, the intermediate command generation unit 30 generates an intermediate command having model data and work data (S40). The sorting unit 40 sorts the intermediate commands generated by the intermediate command generation unit 30 in the sequence defined by the sort keys assigned to the model data (S50). The graphics command conversion unit 50 converts the sorted intermediate commands into graphics commands (S60). To render a subsequent frame (Y in S70), control is returned to step S40 so that steps S40-S60 are repeated. If the process is terminated in the current frame (N in S70), the graphics command generation process is terminated.

Figure 6:
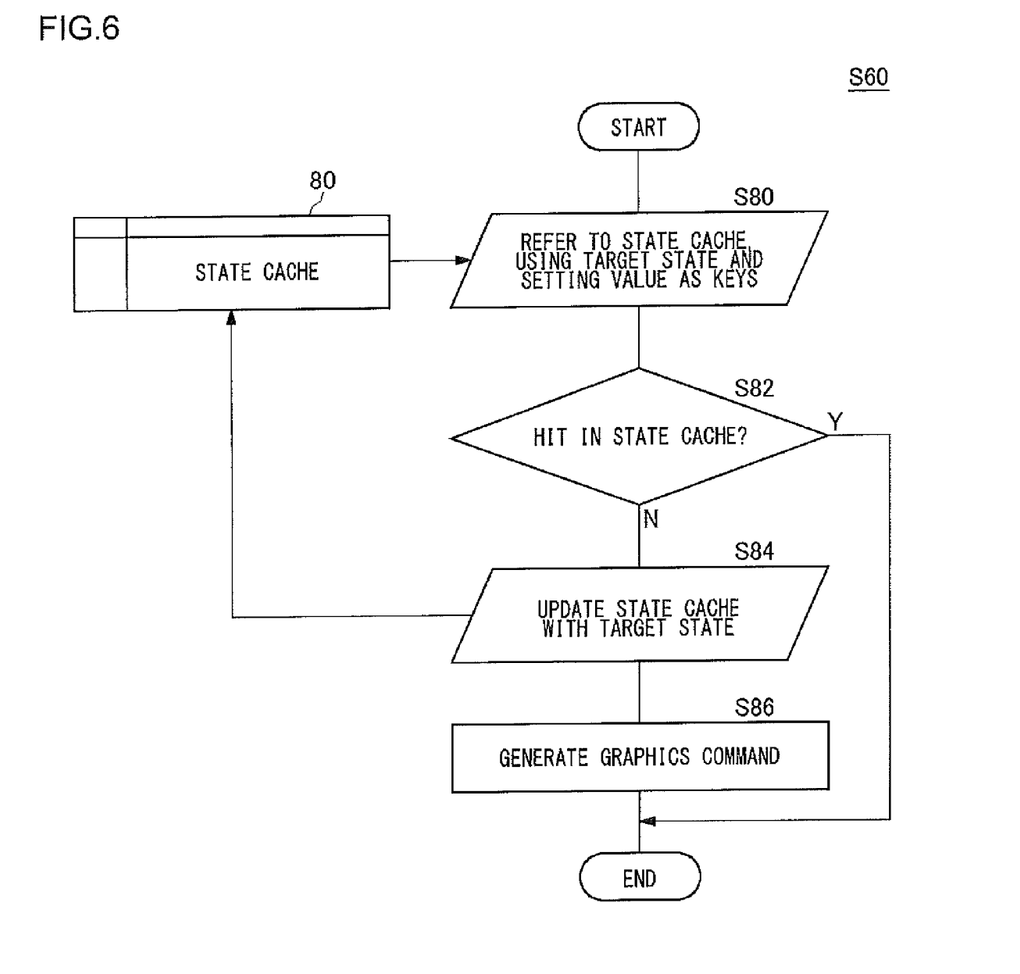
FIG. 6 is a flowchart showing the details of conversion into graphics commands in step S60 executed by the graphics command conversion unit.

FIG. 6 is a flowchart showing the details of conversion into graphics commands in step S60 executed by the graphics command conversion unit 50.

The identity determination unit 60 in the graphics command conversion unit 50 refers to the state cache 80, using the state of the graphics command about to be generated from the intermediate command as a key, and examines whether the state value is cached (S80).

When a cache hit of the state value occurs in the state cache 80 (Y in S82), it means that the graphics command with the same state value has already been executed. Therefore, the identity determination unit 60 determines that the graphics command about to be generated from the intermediate command is redundant. The graphics command generation unit 70 terminates the process without generating this graphics command.

Conversely, if a cache hit of the state value does not occur in the state cache 80 (N in S82), it means that the graphics command about to be generated from the intermediate command was executed previously with a different state value or the graphics command has not been executed yet. In this case, the identity determination unit 60 determines that the graphics command about to be generated from the intermediate command is not redundant and updates the state cache 80 with the state value (S84). The graphics command generation unit 70 generates the graphics command from the intermediate command (S86).

The identity determination unit 60 and the graphics command generation unit 70 repeat the steps S80-S86 by using the state cache 80, and converts the intermediate command sequence into the graphics command sequence accordingly. This generates the graphics command sequence in which redundant graphics commands defining the same setting are removed.

Specific examples of the types of state cached in the state cache 80 will be given below.

(1) Program ID of the fragment shader/vertex shader

A unique ID is assigned to fragment shader programs and vertex shader programs as they are generated and is stored in the state cache 80. The identity determination unit 60 determines that program setting commands are redundant if their IDs are identical, and the graphics command generation unit 70 skips generation of one of the program setting commands. In case that the shader is located in a single logical address space, the ID may be the start address of the space.

(2) Texture ID A unique ID is assigned to a texture as it is generated. The state cache 80 stores the ID for each texture unit. The identity determination unit 60 checks the IDs of texture units at the time of rendering. If the IDs are identical, the identity determination unit 60 determines that the texture setting commands are redundant, and the graphics command generation unit 70 skips generation of one of the texture setting commands. In case that the texture is located in a single logical address space, the ID may be the start address of the space.

(3) Setting values of depth test/blend/stencil test

The setting as to whether to perform a depth test, blend, and a stencil test is stored in the state cache 80 in the form of a Bool value. If the setting values are identified as being equal, the identity determination unit 60 determines that the associated commands for setting whether to perform a depth test, blend, and a stencil test are redundant. The graphics command generation unit 70 skips generation of one of the setting commands.

(4) Depth test function/blend function/stencil test operator

A constant meaning a defined function is cached in the state cache 80. In the case of a depth test function, a constant identifying whether the depth function is set to equal (=), less than (<), or greater than (>) is stored in the state cache 80. In the case of a blend function, a constant identifying a blend ratio is stored. In the case of a stencil test operator, a constant identifying increment or decrement is stored. The identity determination unit 60 determines that function setting commands are redundant if the constants identifying the functions are identical, and the graphics command generation unit 70 skips generation of one of the setting commands.

(5) Matrices IDs are assigned to respective matrices, and the state cache 80 stores the IDs. The identity determination unit 60 determines that setting commands for matrices are redundant if their IDs are identical, and the graphical command generation unit 70 skips generation of one of the matrix setting commands. For example, in the case of a View matrix or a Projection matrix, substantially the only switching during rendering occurs between shadow map rendering and normal rendering. In many cases, therefore, generation of a matrix setting command can be skipped.

In summary, the states cached in the cache state 80 are as follows.

View Matrix ID
Projection Matrix ID
Model Matrix ID
Fragment Shader ID
Vertex Shader ID
Texture ID
Depth Test (Enable/Disable)
Depth Test Function
Stencil Test(Enable/Disable)
Stencil Test Function
Blend (Enable/Disable)
Blend Function As described above, according to the graphics command generation device 200 of the embodiment, intermediate commands sorted according to the transition cost of model data are successively converted into graphics commands. In the process of conversion into graphics commands, the number of graphics commands generated is reduced and the processing efficiency is improved by caching the state values defined by the graphics commands and generating graphics commands only when the defined state value changes. The GPU hardware is designed to perform a deep pipeline operation. If any of the states changes, stall occurs towards an early stage in the pipeline so that the system should await an update to the state. According to the embodiment, reduction in performance associated with context switching inside the GPU hardware can be mitigated so that a larger amount of data can be rendered than otherwise.

A description will be given, with reference to FIGS. 7-9, of several applications of the graphics command generation device 200 according to the embodiment.

Figure 7:
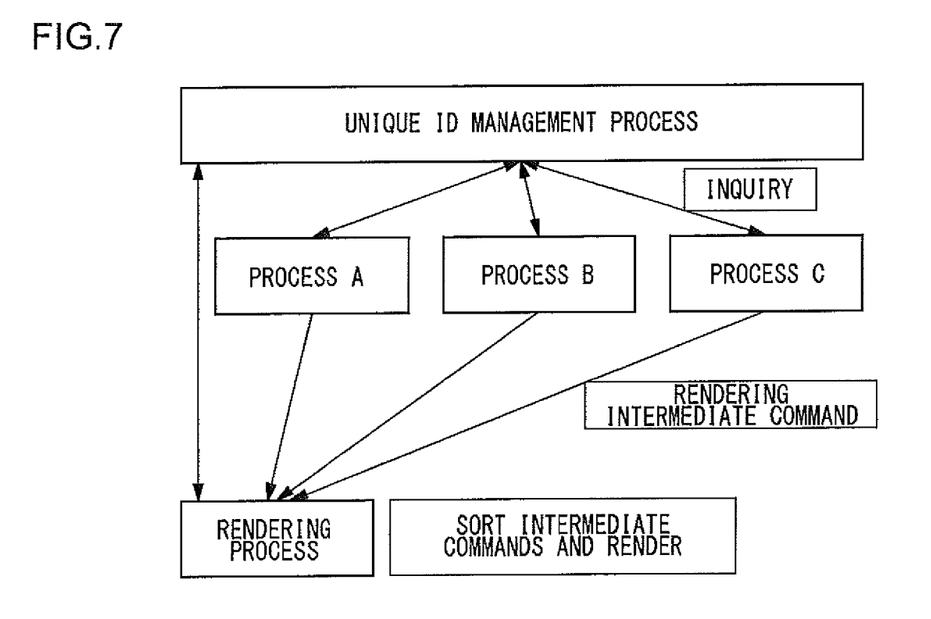
FIG. 7 shows a system where an intermediate command sequence is generated in a plurality of processes, and sorting and redundancy elimination are performed in a single rendering process.

FIG. 7 shows a system where an intermediate command sequence is generated in a plurality of processes, and sorting and elimination of redundancy are performed in a single rendering process.

A plurality of processes A-C generate intermediate command sequences for rendering in parallel. A unique ID management process that assigns IDs to resources such as a texture, a shader or others is located in the system and manages the system so that unique resource IDs are used throughout the system. Each of the processes A-C inquires the unique ID management process about the ID of the resources and assigns sort keys to the model data. The intermediate command sequence generated by each of the processes A-C is delivered to the single rendering process. The rendering process ultimately sorts the intermediate command sequence according to the sort keys, converts the intermediate command sequence into the graphics command sequence, and eliminates redundancy through identity determination based on the state.

In this case, the functions of the transition cost computation unit 10, the sort key assigning unit 20, and the intermediate command generation unit 30 of the graphics command generation device 200 are implemented in the processes A-C, but the functions of the sorting unit 40, the identity determination unit 60, and the graphics command generation unit 70 are implemented in the single rendering process.

An advantage of this application is that the process can be distributed by using a plurality of processes so that the processing efficiency is improved.

Figure 8:
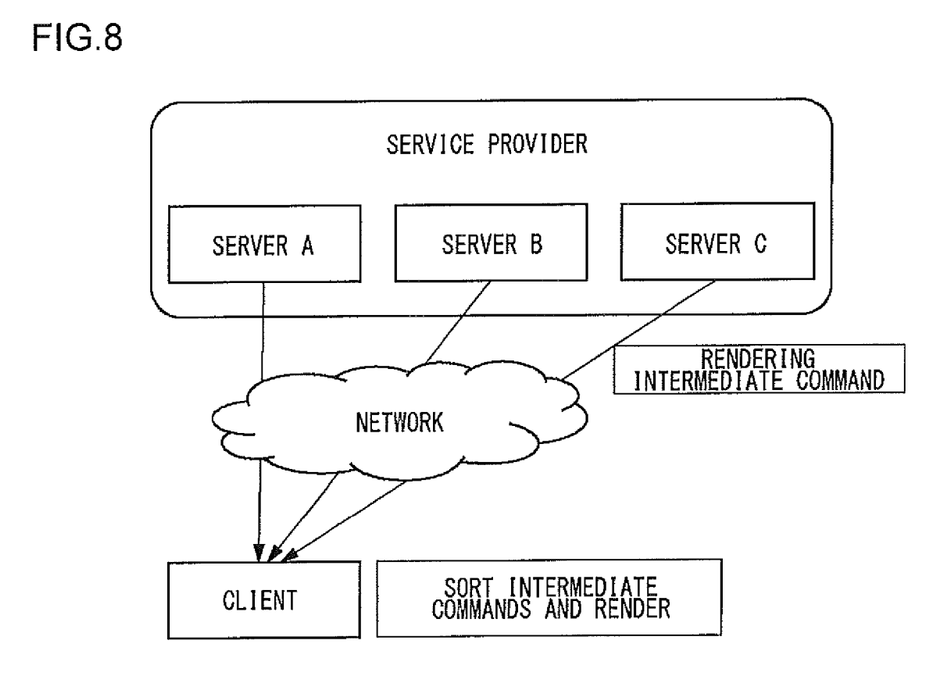
FIG. 8 shows a system where an intermediate command sequence for rendering is generated by a plurality of servers, and sorting and redundancy elimination are performed in a client which communicates with the server.

FIG. 8 shows a system where intermediate command sequences for rendering are generated by a plurality of servers, and sorting and redundancy elimination are performed in a client which communicates with the server.

The service provider assigns IDs to the resources such as a texture, a shader or others and manages the resources. The servers A-C generate intermediate command sequences for rendering in parallel and deliver sort keys for the model data to the application in a client along with the content, allowing the client to sort the intermediate commands and generate graphics command in which redundancy is eliminated.

In this case, the functions of the transition cost computation unit 10, the sort key assigning unit 20, and the intermediate command generation unit 30 of the graphics command generation device 200 are implemented in the servers A-C, but the functions of the sorting unit 40, the identity determination unit 60, and the graphics command generation unit 70 are implemented in the client.

An advantage of this application is that the load imposed by rendering on the client can be reduced, the rendering efficiency of the client can be improved, and the power consumption in the client is reduced.

Figure 9:
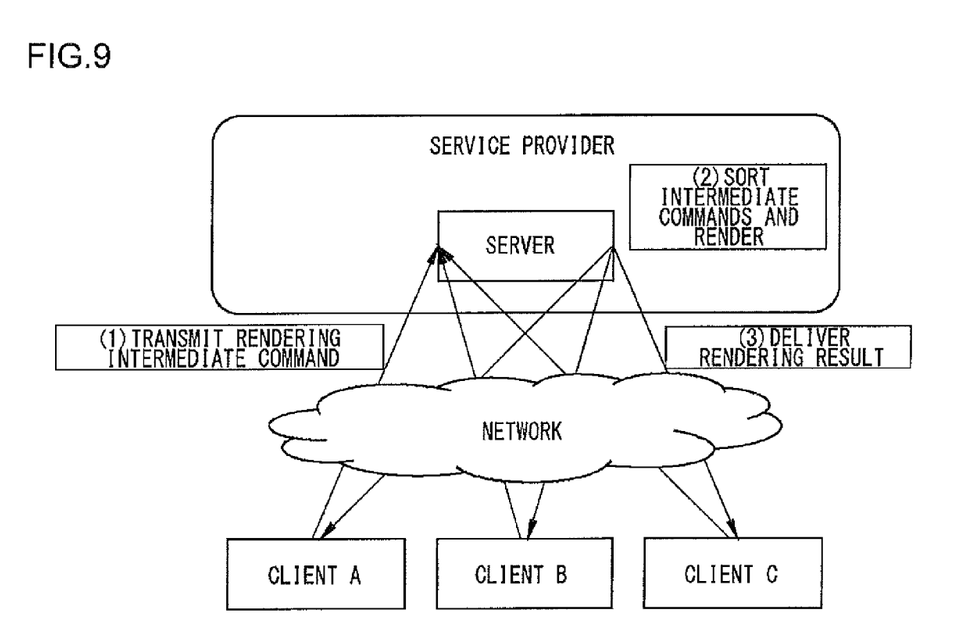
FIG. 9 shows a system where an intermediate command sequence is generated by a plurality of clients and sorting, and sorting and redundancy elimination are performed in a server which communicates with the plurality of clients.

FIG. 9 shows a system where intermediate command sequences are generated by a plurality of clients, and sorting and redundancy elimination are performed in a server which communicates with the plurality of clients.

The client creates a model comprising a combination of model data created by the service provider in advance, and sends the rendering intermediate command to the server. The server acknowledges the intermediate commands created by the plurality of clients A-C and renders the commands on one screen. For example, when a large image is rendered, a plurality of clients are often used to generate intermediate commands in parallel so that the server receives the intermediate commands from the plurality of clients A-C and renders the image accordingly.

The server sorts the intermediate commands received from the plurality of clients A-C. The server converts the intermediate commands into a graphics command sequence such that redundant graphics commands are eliminated. The server then uses the graphics commands for rendering.

Ultimately, the server delivers the rendered image to the clients A-C. The image includes model data transmitted by other clients.

In this case, the functions of the transition cost computation unit 10, the sort key assigning unit 20, and the intermediate command generation unit 30 of the graphics command generation device 200 are implemented in the clients A-C, but the functions of the sorting unit 40, the identity determination unit 60, and the graphics command generation unit 70 are implemented in the server.

In this application, power consumption and computing resources of the server can be reduced.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. A graphics command generation device comprising:
an intermediate command sequence generation unit configured to generate a sequence of intermediate commands, each intermediate command having model data and work data for rendering an object, the model data representing information not updated between frames and the work data representing information updated for each frame, the model data being stored separately from the work data;
an intermediate command sequence modification unit configured to modify the sequence of intermediate commands by sorting the model data by transition cost separately from the work data to determine a sort order of the model data, and then sequencing the intermediate commands according to the sort order; and
a graphics command conversion unit configured to
convert each intermediate command of the modified intermediate command sequence into a graphics command sequence, each graphics command sequence having a set of graphics commands, the graphics command sequences collectively forming a non-optimized graphics processing unit command sequence, and
optimize the non-optimized sequence to generate and deliver to a graphics processor for execution an optimized graphics processing unit command sequence including one or more of the graphics commands of the non-optimized sequence,
wherein the graphics command conversion unit comprises:
an identity determination unit configured to compare sequential ones of the graphics command sequences to determine whether a state value of a graphics command to be included in the optimized sequence is the same as a state value of a graphics command generated previously; and
a graphics command generation unit configured to include in the optimized sequence a graphics command determined by the identity determination unit as not having a state value that is the same, and to not include in the optimized sequence a graphics command determined as having the same state value, defining said command as a redundant command.

2. The graphics command generation device according to claim 1,
wherein the graphics command conversion unit further comprises a state cache configured to cache a state value of a graphics command,
wherein the identity determination unit refers to the state cache, using as a key a state value of a graphics command to be included in the optimized sequence, determines, in the event of a cache hit, that the state value of the graphics command to be included in the optimized sequence is the same as a state value of a graphics command generated previously, and updates, in the absence of a cache hit, the cache with the state value of the graphics command to be included in the optimized sequence.

3. The graphics command generation device according to claim 1, further comprising:
a transition cost computation unit configured to compute a transition cost indicating a load imposed on hardware involved in graphics computation as a result of changing model data for rendering an object;
a sort key assigning unit configured to determine a sequence in which the model data should make a transition based on the transition cost, and to assign sort keys to respective items of model data in accordance with the determined sequence of transition; and
a sorting unit configured to organize a sequence of execution of a plurality of intermediate commands generated by the intermediate command sequence generation unit in accordance with the sort key assigned to the model data of the intermediate commands,
wherein the graphics command generation unit includes the plurality of intermediate commands, the sequence of which is organized by the sorting unit, in an optimized graphics command sequence.

4. The graphics command generation device according to claim 3,
wherein the sort key assigning unit starts with a given item of model data and determines the sequence in which the model data should make a transition by scanning the model data in the ascending order of the transition cost.

5. The graphics command generation device according to claim 3,
wherein the sort key assigning unit starts with the model data that most occupies the displayed screen area and determines the sequence in which the model data should make a transition by scanning the model data in the ascending order of the transition cost.

6. A graphics command generation method comprising:
generating a sequence of intermediate commands, each intermediate command having model data and work data for rendering an object, the model data representing information not updated between frames and the work data representing information updated for each frame, the model data being stored separately from the work data;
modifying the sequence of intermediate commands by sorting the model data by transition cost separately from the work data to determine a sort order of the model data, and then sequencing the intermediate commands according to the sort order; and
converting each intermediate command of the modified intermediate command sequence into a graphics command sequence, each graphics command sequence having a set of graphics commands, the graphics command sequences collectively forming a non-optimized graphics processing unit command sequence, and
optimizing the non-optimized sequence to generate and deliver to a graphics processor for execution an optimized graphics processing unit command sequence including one or more of the graphics commands of the non-optimized sequence,
wherein said converting and optimizing comprises:
comparing sequential ones of the graphics command sequences to determine whether a state value of a graphics command to be included in the optimized sequence is the same as a state value of a graphics command generated previously; and
including in the optimized sequence a graphics command determined as not having a state value that is the same, and not including in the optimized sequence a graphics command determined as having the same state value, defining said command as a redundant command.

7. A non-transitory computer-readable recording medium encoded with a graphics command generation program comprising:
a generation module configured to generate a sequence of intermediate commands, each intermediate command having model data and work data for rendering an object, the model data representing information not updated between frames and the work data representing information updated for each frame, the model data being stored separately from the work data;
an intermediate command sequence modification unit configured to modify the sequence of intermediate commands by sorting the model data by transition cost separately from the work data to determine a sort order of the model data, and then sequencing the intermediate commands according to the sort order; and
a graphics command conversion module configured to
convert each intermediate command of the modified intermediate command sequence into a graphics command sequence, each graphics command sequence having a set of graphics commands, the graphics command sequences collectively forming a non-optimized graphics processing unit command sequence, and
optimize the non-optimized sequence to generate and deliver to a graphics processor for execution an optimized graphics processing module command sequence including one or more of the graphics commands of the non-optimized sequence,
wherein said graphics command conversion module comprises:
an identity determination module configured to compare sequential ones of the graphics command sequences to determine whether a state value of a graphics command to be included in the optimized sequence is the same as a state value of a graphics command generated previously; and
a graphics command generation module configured to include in the optimized sequence a graphics command determined by the identity determination module as not having a state value that is the same, and to not include in the optimized sequence a graphics command determined as having the same state value, defining said command as a redundant command.

* * * * *